Patented June 21, 1949

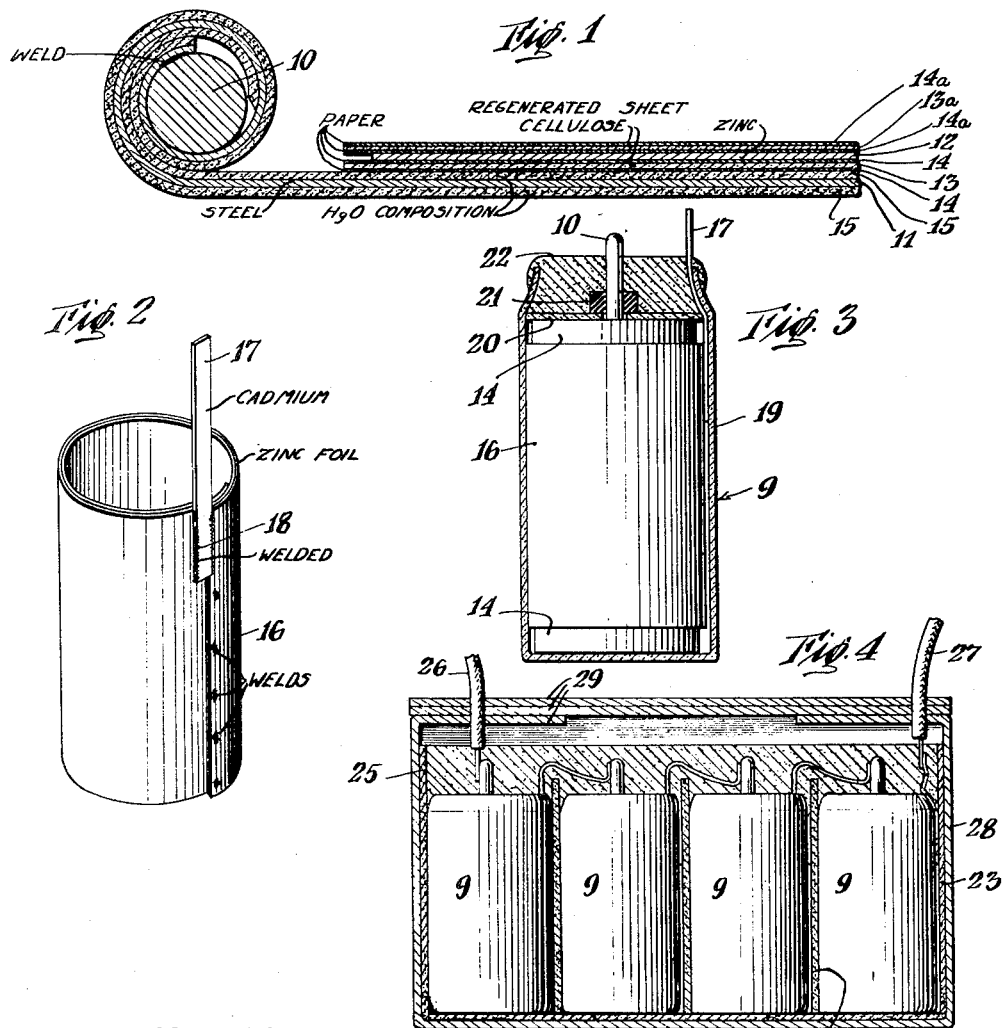

2,473,546

UNITED STATES PATENT OFFICE 2,473,546

ALKALINE PRIMARY CELL

Samuel Ruben, New Rochelle, N. Y.

Application January 23, 1943, Serial No. 473,320

16 Claims. (Cl. 136—107)

This invention relates to primary cells.

An object of the invention is to improve primary cells and dry cells.

Another object is to improve the life of a primary cell under adverse conditions.

Other objects of the invention will be apparent from the description and claims.

In the drawings:

Figure 1 shows an electrode assembly for a primary cell in the process of assembly;

Figure 2 shows a terminal member for the cell;

Figure 3 is a sectional elevation of a completed cell;

Figure 4 shows a multi-cell battery, and

Figure 5 is a graph containing curves showing the voltage output of a cell of the present invention compared with that of a cell of the prior art.

The present invention comprises an improvement on the primary cells described in my prior copending applications Serial No. 456,160 filed August 26, 1942 which has become abandoned and Serial No. 468,386 filed December 9, 1942.

In my application, Serial No. 456,160 which has become abandoned, of which the present application is a continuation-in-part, I describe a primary cell comprising a zinc foil anode, a cathode comprising a steel foil coated with a depolarizing composition such as cupric oxide, sulphides of copper, lead sulphides or oxides and the like, a semi-permeable member interposed between the foil electrodes and an alkaline electrolyte.

In my co-pending application, Serial No. 468,386 (now U. S. Letters Patent 2,463,565), I describe a primary cell comprising a zinc foil anode, a cathode comprising a steel foil coated with a depolarizing composition such as cupric oxide, sulphides of copper, lead sulphide or oxide and the like, a spacer between the electrodes and an electrolyte comprising a concentrated alkali metal hydroxide containing water of hydration.

The invention contemplates a primary electric cell having electrodes of zinc or the like and a depolarizer formed of a mercury compound such as mercuric oxide with an alkaline electrolyte such as potassium hydroxide. The electrodes may be of large surface area and closely spaced, being separated by a spacer comprising a semi-permeable membrane. For use where high temperatures are encountered, such as in the tropics or for maximum shelf life, the electrolyte is preferably a solid crystalline material containing water of hydration. For low temperature operation the electrolyte may be a liquid of such high concentration as to prevent freezing at the lowest operating temperature.

Heretofore primary cells have been produced using alkaline electrolytes such as potassium and sodium hydroxide as liquid solutions. These have always required careful handling and sealing in order to prevent loss of the electrolyte. Moreover, such primary cells were subject to rapid deterioration at elevated temperatures due to accelerated attack on the electrodes by the electrolyte. Zinc is commonly used as one electrode in such cells and it is quite susceptible to attack by liquid alkaline solutions.

Depolarizing electrodes for such cells have been formed either of porous carbon or of cupric oxide. The porous carbon type depends upon air for depolarizing effect. The cupric oxide type is not dependent upon air and permits a relatively high current capacity for a given volume of cell. However, when the cell is left on open circuit, trouble results due to some of the copper compound dissolving in the electrolyte and migrating to the zinc electrode where copper is deposited, setting up local electrochemical action and causing rapid dissolution of the zinc electrode. This action is much accelerated when the temperature of the cell is increased. For this reason such cells have heretofore not been found satisfactory where they were required to be stored or left on open circuit for any extended period of time and it has been also necessary to space the zinc and copper compound electrodes rather far apart.

In the prior art in the so-called dry cells the electrolyte is a liquid but is prevented from running out of the cell by being absorbed in a porous solid such as paper, carbon, manganese dioxide or finely divided inert porous materials. However, the electrolyte remains as a liquid when absorbed in these media. Its chemical and corrosive action at high temperatures, resulting in a deterioration of the cells, is not reduced. Electrolytes have also been immobilized by the addition of a gelatinizing agent such as starch but this likewise has not reduced the chemical shelf action or deterioration at elevated temperatures.

As described in my copending application Serial No. 456,160, which has become abandoned, I have found that the use of a semi-permeable membrane between the electrodes materially reduces local chemical or electro chemical action and improves the shelf life as well as the operating life of the cells.

As described in my other copending application Serial No. 468,386, I have found that the life of such primary cells or dry cells can be further increased so as to produce good open circuit life even at elevated temperatures such as are encountered in the tropics, by using solid crystalline alkaline electrolytes containing water of hydration. The solid electrolyte helps to prevent migration of copper compounds which would otherwise attack the zinc electrode and also, because of its solid nature, does not itself as readily attack either the zinc or copper oxide electrodes when the cell is on open circuit. Another and important factor is the hygroscopic nature of solid potassium hydroxide which eliminates loss of moisture inherent in immobilized liquid electrolytes.

While cells of both the types described in my prior applications showed a marked improvement over commercial cells of the prior art, I have now discovered that a further improvement can be obtained and a cell having much longer life at elevated temperatures produced by using a depolarizing electrode of a mercury compound, preferably mercuric oxide, instead of the copper oxide used in the prior cells. It has been found, for example, that cupric oxide is somewhat soluble in the electrolytes such as potassium hydroxide and some dissolution takes place during impregnation of the cell unit by the hot liquid alkaline electrolyte. While the use of a semipermeable membrane and the use of an electrolyte which is solid at temperatures encountered during use will substantially prevent migration of the dissolved copper compound to the zinc where internal battery action can take place causing deterioration, I have now found that the use of a mercury compound incrceases the life of such cells still further. I believe this is due in a large part to the fact that mercury compounds are insoluble in the alkaline electrolytes and do not deposit reduction products on the zinc which cause local action.

Mercuric oxide is the preferred material. Since this oxide is a poor conductor of electricity in its pure state, it is combined or mixed with a finely divided conductor such as graphite and bonded as a layer on a conductive backing such as metal foil.

Used in this manner I have found that the cell has a further improvement over those using cupric oxide as a depolarizer in having a higher output voltage. The open circuit voltage of a cell having a zinc electrode, a potassium hydroxide electrolyte, and a mercuric oxide-graphite depolarizer is approximately 1.4 volts as compared to 1.06 volts for a cell using a cupric oxide depolarizer.

Referring to the drawing, Figure 1 illustrates the preferred electrode assembly of a dry cell of my invention. A thin strip of a suitable ferrous material such as sheet iron or steel 11 coated with the mercury compound 15 is welded at one end to a steel rod 10 and then two or three turns of the sheet are wrapped tightly around the rod. A spacer assembly comprising a layer 13 of 1.5 mil thick glycerine free regenerated sheet cellulose interposed between two layers 14 of 1 mil Dexter paper is then laid on the unwound portion of the steel strip and a strip of 2 to 3 mil zinc foil 12 which is to comprise the zinc electrode of the cell is laid on top of this spacer assembly. A second spacer assembly formed in the same manner of a layer of regenerated sheet cellulose 13a between two paper layers 14a is then laid on top of the zinc foil and the entire assembly is then wound into a roll wherein the coated steel sheet 11 is separated from the zinc foil 12 by the spacer assemblies of regenerated sheet cellulose and paper. The paper and regenerated cellulose strips are at least ⅛ inch wider than the steel strip and the zinc foil so that they project slightly beyond the electrodes at each end to afford adequate separation at the ends of the roll. The spacer layers are somewhat longer than the steel strip so that they extend beyond its end when the roll is wound up but the zinc foil strip extends beyond the spacers so as to form a final turn of zinc foil on the outside of the roll.

Before proceeding with the description of the cell, the mercury compound coating 15 will be described in greater detail. The composition may be formed by milling together red mercuric oxide mixed with 1 to 15% (preferably 3%) of micronized graphite of extremely small particle size, such as 5 to 9 microns, and a 10% solution of polymerized vinyl chloride in a solvent, such as an ether. 46 grams of the powder mixture to 30 grams of solution makes a suitable composition. The resulting composition is applied by spraying or painting to both surfaces of steel sheet 11 after it has first been given a matte surface by sandblasting or other methods. Sheet 11 may suitably be formed of steel 2 mils thick. A preferred thickness for the coat is about 2.75 mils on each side of the steel backing. After drying, the coating is baked at a temperature of 130° C. for several hours. The coated steel strip may then be rolled between steel rollers such as those used for rolling metal stock. This increases the density and conductivity of the coating, giving it a smooth uniform surface. The rolling is done at a relatively high temperature such as around 125° C.

A terminal for the zinc electrode is constructed as shown in Figure 2 by preparing a cylinder 16 from zinc foil and welding a terminal strip 17 to the side of the cylinder at 18 by spot welding. The weld also unites the ends of the foil comprising cylinder 16.

Terminal 17 is preferably formed of a flat strip of cadmium metal. I have found that during impregnation of the cell with an alkaline hydroxide electrolyte a certain amount of the electrolyte always remains on the terminal and it is very difficult to completely remove it from the projecting portion of the terminal which extends outside the cell. If this terminal is formed of zinc this has resulted in corrosion of the projecting portion of the terminal. I have found that cadmium metal is not subject to this alkali corrosion.

After the electrode assembly is wound as described in connection with Figure 1, it is inserted, while still dry, inside cylinder 16 comprising part of the terminal assembly of Figure 2 so that the outer turn of the zinc foil electrode 12 engages the inside of cylinder 16. The dimensions are suitably chosen so that insertion may be made resulting in a firm but not extremely tight fit.

The electrode-terminal assembly thus formed is then impregnated with the alkali metal hydroxide electrolyte. The electrolyte is preferably a solution of potassium hydroxide. Where the cell is to be used in high temperatures such as in the tropics or in certain industrial applications and for maximum shelf life at ordinary temperatures I prefer to use an electrolyte formed of 340 grams of C. P. KOH (containing 13 to 14% water) in 100 milliliters of water. For normal use an electrolyte formed of 300 grams C. P. KOH to 100 milliliters of water is satisfactory, and where low temperatures are to be encountered 50 to 150 grams C. P. KOH per 100 milliliters of water is used depending on the temperature to be encountered. For example, 50 grams potassium hydroxide per 100 milliliters of water provides an electrolyte which will operate at temperatures as low as 60° below zero centigrade. Concentrations of potassium hydroxide above 160 grams C. P. KOH per 100 milliliters of water will solidify when cooled to room temperature. It is necessary to heat the solution to about 120° C. to dissolve all the hydroxide where the higher concentrations are used. While other concentrations of electrolyte may be used, the preferred range for dry cells having a solid electrolyte is between 160 and 400 grams C. P. KOH per 100 milliliters of water. For absorbed type dry cells where the electrolyte remains as a liquid absorbed in the spacers the preferred range is 25 to 160 grams C. P. KOH.

The cell assembly which has been produced in the manner above described is heated to about 100° C. and immersed at this temperature in the hot liquid electrolyte and a partial vacuum (such as a reduction in pressure to 5 cm. of mercury) is preferably applied to improve the impregnation of the space between the electrodes and the absorption of the electrolyte into the spacers.

After a vacuum has been applied to remove all the air from the electrode-spacer assembly, I prefer to apply a pressure of about 100 pounds per square inch while the assemblies are still immersed in the liquid electrolyte and to maintain this temperature until the temperature of the electrolyte has dropped to about 80° C.

The impregnated assemblies are then removed from the electrolyte and the excess electrolyte is then wiped off. During impregnation the spacers swell considerably during absorption of the electrolyte and develop a high pressure between the outer turn of zinc foil and the terminal cylinder 16 producing perfect contact between the electrode and cylinder.

The cell assemblies are then inserted in Pliofilm tubes 19 (see Figure 3). Tubes 19 are either molded of Pliofilm or formed from sheet Pliofilm which can be readily heat welded. The bottom of said tubes is closed. The Pliofilm washer 20 is then inserted over the center electrode 10 and against the top of the roll and a small rubber sleeve 21 is pressed down over the terminal 10 to hold the washer down. A layer of insulating pitch 22 such as gilsonite is then poured into the top of tube 19 to seal the cell. This results in the completed cell 9 shown in Figure 3.

Any number of such cells may be connected in series to form a dry battery if desired, one form of battery construction being shown in Figure 4. This comprises an inside waxed cardboard box 23 containing partitions 24 defining spaces into which the cells 9 are inserted. The cadmium terminal 17 of each cell is then soldered to the steel terminal 10 of the next adjacent cell so as to connect all the cells in series and a layer 25 of pitch is poured over the tops of the cells to cover the terminals. A battery terminal wire 26 is soldered to the terminal 10 of the end cell of the series and a terminal wire 27 is soldered to the cadmium terminal 17 at the other end of the series. The battery thus produced may then be included in an outer protective cardboard box 28 having flaps 29 which fold down over the top of the battery and have suitable notches or openings through which the battery terminal wires extend.

Figure 5 illustrates the comparative performance of a cell of the present invention and a cell of the prior art, namely an American standard A cell. The curve 30 shows the voltage output of a zinc-KOH-HgO cell at 25° C. through a 22 ohm load. The cell had an electrode area of 11 square inches, the cell dimensions being 5/8 inch in diameter and having an electrode 3/4 inch wide. The electrolyte used was formed from 340 grams KOH to 100 milliliters of water. Curve 31 shows for comparison the voltage output of a standard A cell which is 5/8 inch in diameter and 1 7/8 inches in height. It will be noted that the potential of the A cell falls below 1 volt after slightly less than 3 hours of operation, while the voltage of the cell of the present invention remains well above 1 volt for more than 7 1/2 hours. It should also be noticed in comparing the performance of these cells that the A cell is 1 7/8 inches long or approximately twice the length of the cell of my invention so that the A cell requires about twice the space of the cell of the present invention.

The comparative performance illustrated in Figure 5 is, of course, the initial performance of both cells. The difference in performance is even more marked after a period of shelf life.

While mercuric oxide (red) is the preferred mercury compound for the depolarizing electrode, other mercury compounds such as mercurous oxide (black) and mercuric sulfide and selenide can be used but are not as effective.

While finely divided graphite is the preferred conductive material which is mixed with the mercury compound, other finely divided conductors may be used such as carbon in its various forms, powdered metals of certain kinds, and finely powdered conductive compounds such as cadmium oxide, for example.

Zinc is the preferred electrode material for the negative electrode but it is also possible to use cadmium or an alloy of zinc and cadmium such as zinc 70%, cadmium 30%. The terminal for the zinc electrode may be cadmium, cadmium plated zinc, magnesium or other metal resistant to alkalies and having a low potential difference in respect to zinc.

Potassium hydroxide is the preferred electrolyte material as it maintains a lower resistance, especially in the solid crystalline form. However, other alkaline electrolytes such as sodium hydroxide and lithium hydroxide may be used in some cases.

Parchmentized paper or other semi-permeable membranes which are not strongly attacked by the alkaline electrolyte may be substituted for the regenerated sheet cellulose. However, regenerated sheet cellulose is the most satisfactory and greatly reduces the danger of a short circuit. In this connection it will be noted that there is substantially no tendency toward migration of mercury compounds in solution as they are substantially insoluble in the electrolyte. However, the semi-permeable membrane is still of importance in preventing short circuits by liquid mercury or mercural compounds developed during operation of the cell. Migration of the mercury or mercury compounds to the zinc is not in itself harmful in this case as mercury will form an amalgam with the zinc and will not set up an excessive internal battery action.

The cells of the present invention may be used individually or assembled as batteries for general purposes including use in radio sets, flash lights, hearing aids and the like. They are also suitable for grid bias cells in circuits of the type shown and described in my Patent No. 2,063,524 issued December 8, 1936, relating to an electric amplifier circuit. For cells of this type the depolarizer may be made by pressing the mercuric oxide-graphite mixture into pellet or wafer form, preferably in combination with an iron electrode backing member.

While specific embodiments of the invention have been described, it is intended to cover the invention broadly within the spirit and scope of the appended claims.

What is claimed is:

1. A primary cell comprising a sheet metal electrode of metal selected from the group consisting of zinc, cadmium, and their alloys, an alkali metal hydroxide electrolyte and a depolarizing electrode spaced from said sheet metal electrode and comprising a conductive sheet of a ferrous material and a mixture of a finely divided conductive material and a compound of mercury with an element from the group consisting of oxygen, sulfur and selenium bonded as a thin conductive surface layer onto said conductive sheet.

2. A primary cell comprising a sheet metal electrode of metal selected from the group consisting of zinc and cadmium, an alkali metal hydroxide electrolyte and a depolarizing electrode spaced from said sheet metal electrode and comprising a conductive sheet of a ferrous material and a mixture of mercuric oxide and a finely divided conductive material bonded with an alkali resistant binder to said conductive sheet.

3. A primary cell comprising a sheet zinc electrode, an alkali metal hydroxide electrolyte and a sheet depolarizing electrode spaced from said zinc electrode and comprising a conductive sheet base of a ferrous material and a coating bonded thereto comprising mercuric oxide and 1 to 15% of finely divided graphite.

4. A primary cell comprising a sheet zinc electrode, an alkali metal hydroxide electrolyte and a sheet depolarizing electrode spaced from said zinc electrode and comprising a steel sheet base and a coating bonded thereto comprising mercuric oxide and 1 to 15% of finely divided graphite.

5. A primary cell comprising a zinc sheet electrode, an electrolyte of potassium hydroxide and water and a sheet depolarizing electrode spaced from said zinc electrode and formed of a conductive sheet base of a ferrous material and a coating bonded thereto comprising mercuric oxide as the active depolarizer and 1 to 15% of finely divided graphite to increase the conductivity of the mixture.

6. A primary cell comprising a zinc sheet electrode, an electrolyte of potassium hydroxide and water and a sheet depolarizing electrode spaced from said zinc electrode and formed of a steel sheet base and a coating bonded thereto comprising mercuric oxide as the active depolarizer and 1 to 15% of finely divided graphite to increase the conductivity of the mixture.

7. A primary cell comprising, in combination, a sheet zinc electrode, a sheet depolarizing electrode in closely-spaced parallel relation thereto, a semi-permeable membrane interposed therebetween and an alkaline electrolyte contacting said electrodes and impregnating said membrane, said depolarizing electrode comprising a conductive sheet of a ferrous material and a coating thereon containing mercuric oxide as the active depolarizing ingredient and a finely divided conductive material mixed therewith to increase the electrode conductivity.

8. A primary cell comprising, in combination, a sheet zinc electrode, a sheet depolarizing electrode in closely-spaced parallel relation thereto, a semi-permeable membrane interposed therebetween and an alkaline electrolyte contacting said electrodes and impregnating said membrane, said depolarizing electrode comprising a steel sheet and a coating thereon containing mercuric oxide as the active depolarizing ingredient, finely divided graphite mixed therewith to increase the coating conductivity and an alkali insoluble binder.

9. A primary cell comprising, in combination, a sheet zinc electrode, a sheet depolarizing electrode, a semi-permeable membrane and at least one layer of fibrous material interposed therebetween, and an alkaline electrolyte impregnating said membrane and fibrous layer, said depolarizing electrode comprising a metal backing of a ferrous material and a depolarizing layer bonded thereto comprising a mixture of mercuric oxide, 1 to 15% of finely divided graphite and a binder, said mercuric oxide being the active depolarizing agent and said graphite increasing the electrical conductivity of said depolarizing layer.

10. A primary cell comprising, in combination, an electrode layer formed from a metal selected from the group consisting of zinc and cadmium, a depolarizing layer closely spaced in face to face relation thereto, and a solid crystalline alkali metal hydroxide electrolyte containing water of hydration between said layers and in contact therewith, said depolarizing layer comprising mercuric oxide as the active depolarizing ingredient and finely divided graphite mixed therewith to increase the conductivity of said layer.

11. A primary cell comprising, in combination, an electrode layer formed from a metal selected from the group consisting of zinc and cadmium, a depolarizing layer closely spaced in face to face relation thereto, and a solid crystalline alkaline electrolyte between said layers and in contact therewith, said depolarizing layer comprising mercuric oxide as the active depolarizing ingredient and finely divided graphite mixed therewith to increase the conductivity of said layer, said electrolyte being formed of potassium hydroxide and water of hydration.

12. A primary cell comprising, in combination, a sheet zinc electrode, a sheet depolarizing electrode, a semi-permeable barrier membrane interposed therebetween, and a solid alkaline electrolyte impregnating said membrane and between said membrane and said electrodes, said membrane being substantially insoluble in said electrolyte, said depolarizing electrode comprising a conductive sheet of a ferrous material coated with a mixture of mercuric oxide as the active depolarizing ingredient and graphite mixed therewith to increase the conductivity thereof.

13. A primary cell comprising spaced parallel electrodes of zinc and of steel coated with a depolarizing composition of mercuric oxide, graphite and an alkali-insoluble binder, and a spacer between said electrodes comprising a semi-permeable membrane, and an electrolyte impregnating said spacer and composed of potassium hydroxide and water.

14. A depolarizing electrode for a dry cell comprising a thin sheet of a conducting metal base of a ferrous material coated with a mixture of a compound of mercury combined with an element selected from the group consisting of oxygen, sulfur and selenium as the active depolarizing ingredients, a finely divided conductive material to increase the conductivity thereof and a binder.

15. A primary cell comprising a sheet zinc electrode, a sheet depolarizing electrode and sheet spacers wound together into a roll with said spacers interposed between said electrodes, said spacers comprising assemblies of a semi-permeable membrane and at least one fibrous layer, and an electrolyte of potassium hydroxide and water impregnating said spacers, said depolarizing electrode comprising a conductive sheet of a ferrous material coated with a depolarizing composition comprising mercuric oxide as the active depolarizing agent, graphite mixed therewith to improve the conductivity and a binder which is insoluble in said electrolyte.

16. A cathode for dry primary cells comprising a base of ferrous metal, and a depolarizer layer compressed on and bonded to said base, said layer consisting of an intimate mixture of an oxide of mercury constituting the depolarizing agent and of an inert conductive material for increasing the conductivity of the layer.

SAMUEL RUBEN.

REFERENCES CITED

The following references are of record in the file of this patent:

UNITED STATES PATENTS

| Number | Name | Date |
| --- | --- | --- |
| Re. 13,420 | Morrison | May 14, 1912 |
| 405,196 | Barrett | June 11, 1889 |
| 856,162 | Kitsee | June 4, 1907 |
| 1,011,485 | Pfleidner | Dec. 12, 1911 |
| 1,028,354 | Heil | June 4, 1912 |
| 1,219,074 | Bronsted | Mar. 13, 1917 |
| 1,309,561 | Beaumont | July 8, 1919 |
| 1,486,172 | Wilhelm | Mar. 11, 1924 |
| 1,489,328 | Martus | Apr. 8, 1924 |
| 1,548,539 | Martus et al. | Aug. 4, 1925 |
| 1,798,287 | Ward | Mar. 31, 1931 |
| 1,863,791 | Heise | June 21, 1932 |
| 2,231,319 | Burgess | Feb. 11, 1941 |

FOREIGN PATENTS

| Number | Country | Date |
| --- | --- | --- |
| 4,475 | Great Britain | 1884 |
| 326,822 | Great Britain | Mar. 19, 1930 |
| 399,561 | Great Britain | Oct. 9, 1933 |